(12) United States Patent
Bixel

(10) Patent No.: US 7,834,577 B2
(45) Date of Patent: Nov. 16, 2010

(54) SYSTEM AND METHOD FOR STARTING A WOUND ROTOR MOTOR

(75) Inventor: Paul S. Bixel, Salem, VA (US)

(73) Assignee: TM GE Automation Systems LLC, Roanoke, VA (US)

( * ) Notice: Subject to any disclaimer, the term of this patent is extended or adjusted under 35 U.S.C. 154(b) by 791 days.

(21) Appl. No.: 11/576,558

(22) PCT Filed: May 13, 2005

(86) PCT No.: PCT/US2005/016862

§ 371 (c)(1), (2), (4) Date: Apr. 3, 2007

(87) PCT Pub. No.: WO2006/124019

PCT Pub. Date: Nov. 23, 2006

(65) Prior Publication Data

US 2008/0018292 A1    Jan. 24, 2008

(51) Int. Cl.
  *H02P 29/04* (2006.01)
(52) U.S. Cl. .................. 318/779; 318/727; 318/722; 318/732
(58) Field of Classification Search .......... 318/811, 318/810, 722, 700, 727, 778, 732, 785
See application file for complete search history.

(56) References Cited

U.S. PATENT DOCUMENTS

| | | | |
|---|---|---|---|
| 4,511,835 A | 4/1985 | Studtmann | |
| 4,567,420 A * | 1/1986 | Beck | 318/803 |
| 4,724,503 A | 2/1988 | Libert | |
| 4,764,713 A | 8/1988 | D'Atre et al. | |
| 5,905,642 A | 5/1999 | Hammond | |
| 7,042,194 B1 * | 5/2006 | Kuroiwa et al. | 318/811 |
| 7,511,446 B2 * | 3/2009 | Bixel | 318/778 |
| 2004/0155526 A1 | 8/2004 | Naden et al. | |
| 2004/0164716 A1 | 8/2004 | Walter et al. | |
| 2006/0097689 A1 * | 5/2006 | Kuroiwa et al. | 318/811 |
| 2006/0175904 A1 * | 8/2006 | Powell | 307/66 |
| 2007/0278985 A1 * | 12/2007 | Bixel | 318/732 |

* cited by examiner

*Primary Examiner*—Paul Ip
(74) *Attorney, Agent, or Firm*—Woods Rogers PLC; Peter E. Rosden

(57) ABSTRACT

A system and method for starting and regulating a wound rotor motor (120) including a phase-controlled SCR converter (150) and a drive circuit (130, 140) having a voltage source inverter (140) and a voltage source converter (130). The SCR converter (150) regulates power transmitted to the drive circuit from the rotor of the motor (120) so that the ratings of the drive circuit are not exceeded.

33 Claims, 3 Drawing Sheets

SYSTEM AND METHOD FOR STARTING A WOUND ROTOR MOTOR

TECHNICAL FIELD

The subject invention relates generally to a system and method for starting a wound rotor motor used in industrial applications. More particularly, the system and method provide an economical and efficient starting circuit for such a motor by arranging conventionally known components in a novel configuration.

BACKGROUND OF THE INVENTION

A wound rotor motor (WRM) can be controlled using a voltage source inverter (VSI) in combination with a voltage source converter (VSC) so that variable motor speed and torque are obtained. An advantage of a this type of system is that only a fraction of the power delivered by the motor to the shaft which it drives must be handled by the drive system, i.e. the VSI/VSC combination. This is a desirable feature since the cost of the drive system is proportional to its capacity.

However, in order to operate under VSI control a WRM must first be started and brought from inactivity to some speed so that the rotor voltage does not exceed the voltage ratings of the drive system. In the prior art, this has been achieved by reliance on expensive starting resistors and contactors. FIG. 1 illustrates such a conventional system where power is supplied from a utility at 10 through a stator isolation breaker 20 connected to the stator of a motor 30. Some power flows out of the rotor of motor 30 during starting when torque is required at the motor shaft and voltage is blocked by inverter isolation breaker 40 from reaching the motor drive elements formed by conventional VSI 50 and conventional VSC 60. Instead, this power is diverted through starting breaker 70 to resistance means 80, which can, for example, be a liquid rheostat or other similarly functioning device, and is dissipated there in the form of heat. When the speed of motor 30 has accelerated to the point that the rotor voltage no longer exceeds the ratings of the VSI 50 breaker 70 opens and inverter isolation breaker 40 closes and the motor continues operation under the control of the VSI 50. The point at which the transition from resistance means 80 to VSI 50 operation defines the minimum operating speed of the system under VSI 50 control.

The power requirement of the motor drive elements is governed by the power generated along the rotor circuit. This can be understood by using the following well-known equations:

$P_{ag} = T \times W_s$ $P_m = T \times W_m$ $P_{rot} = P_{ag} - P_m$ where the rotor circuit power ($P_{rot}$) equals the difference between the air gap power ($P_{ag}$) and the mechanical power ($P_m$). The air gap power ($P_{ag}$) is determined by the product of the shaft torque (T) times the power utility frequency along the mains ($W_s$), while the mechanical power ($P_m$) is determined by the product of the shaft torque (T) and the mechanical speed ($W_m$). From these equations, it becomes clear that slow motor speed and high torque, which can be the case at starting, can lead to high rotor circuit power. As a result, the conventional arrangement in FIG. 1 was developed to prevent the power capability of the VSI and VSC drive elements from being exceeded during starting when the speed of the motor is low and torque demands are high. However, this protection is achieved by means of inclusion in the starting circuit of expensive and bulky resistance and breaker devices.

What is needed is a more efficient and economical way to achieve this same goal by making the resistance and breaker components superfluous and eliminating them.

SUMMARY OF THE INVENTION

This invention relates to a system and method for starting and regulating an AC powered wound rotor motor. The system includes a phase-angle controlled silicon controlled rectifier converter (SCRC) connected at its input to the rotor of the motor. The output of the SCR converter is connected to a drive circuit having a voltage source inverter (VSI) and a voltage source converter (VSC). The input of the VSI is connected to the output of the SCRC, while the output of the VSI is connected to the input of the VSC. The output of the VSC feeds back into the AC line circuit which is connected to the stator of the motor. The method of the invention involves supplying AC power to the stator of the motor. The power produced at the rotor of the motor is delivered to the SCRC which regulates the amount of such power which is transferred to the drive circuit by adjusting the gating of its silicon controlled rectifiers in response to a phase angle signal. The SCRC is designed so that the ratings of the drive circuit components are not exceeded during starting of the motor.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE INVENTION

Figure 1:
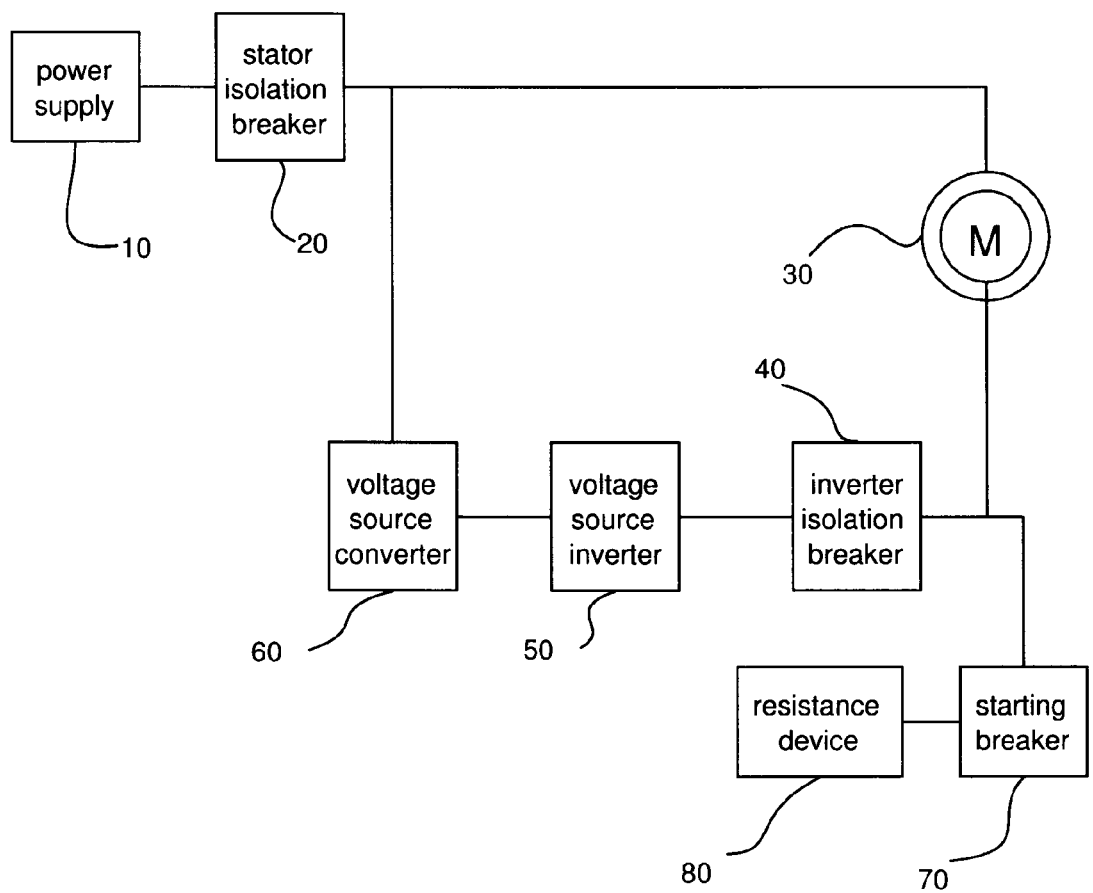
FIG. 1 is a block diagram of the components of a conventional motor starting circuit.
Figure 2:
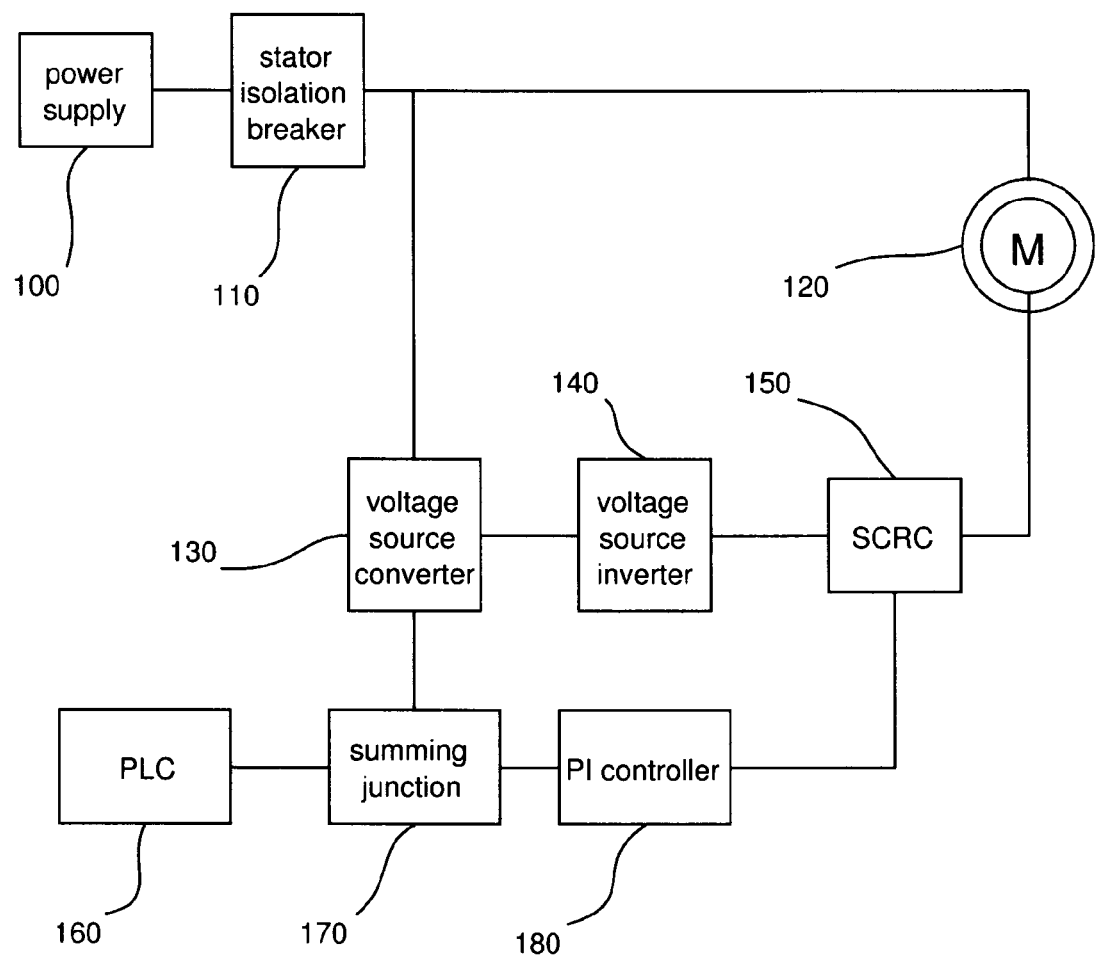
FIG. 2 is a block diagram of the components of the starting circuit of this invention.

For a more detailed understanding of the invention, reference is first made to FIG. 2 of the drawings which presents a block diagram view of the components in the preferred embodiment of the starting circuit of this invention. As in FIG. 1, power is provided from a power supply 100, such as a utility mains, generator or any other source of AC power, through a protective stator isolation breaker 110 to a wound rotor motor 120. Typically, three phase power is provided in such a system although other arrangements are possible depending on specific system requirements. Stator isolation breaker 110 provides thermal protection of the motor circuit, allows for disconnection of the motor and drive elements for maintenance and provides protection against short circuit faults anywhere in the system.

The drive elements include VSC 130 and VSI 140. VSC 130 is an isolated gate bipolar transistor (IGBT)-based DC/AC power supply and is connected through an AC bus to stator isolation breaker 110. It controls the voltage of the DC bus connecting VSC 130 to VSI 140. VSC 130 can cause power to flow in either direction to maintain the DC bus voltage at a required setting and has ratings based on its design which may not be exceeded. The term ratings refers, for the purpose of this invention, to the maximum power, current and voltage handling capability of a particular component. The cost of VSC 130 is directly proportional to its ratings, so keeping the rated power as low as possible is a desirable objective. In certain designs where a particularly large power rating is required, VSC 130 may be comprised of several voltage source controllers connected in parallel in order to achieve the desired power rating. VSI 140 is also an IGBT-based power supply. It is similar in design to VSC 130 and also has ratings based on its design, but it controls motor torque rather than a DC voltage bus. VSC 130 and VSI 140 are conventional elements similar to VSC 60 and VSI 50. VSI 140 is coupled to an AC bus connected to a phase control silicon controlled rectifier converter (SCRC) 150.

SCRC 150 is comprised of at least four SCR's connected in two or more anti-parallel arrangements as described further below with reference to FIGS. 3 and 4. Moreover, each SCR within SCRC 150 may be further comprised of a block of one or more SCR's connected in parallel. SCRC 150 is initially in an "off" state and is gradually turned to a fully "on" state in response to a phase angle signal. Control of SCRC 150 may be exerted in a number of ways. For example, in the preferred embodiment, a power reference signal is provided by signal generator 160 which is a programmable logic circuit (PLC) or any other type of controller capable of the same function and may be powered either by the circuit of this invention or independently. The reference signal is typically generated after stator isolation breaker 110 is closed although an overriding multi-system control could be implemented providing for independent generation of such a signal. The signal so generated is delivered to summing junction 170 together with a feedback power signal from VSC 130. The feedback signal is subtracted from the reference signal to produce an error signal. This error signal is transmitted to a conventional proportional-integral (PI) controller 180 which uses that signal to generate a phase angle signal for transmission to and control of SCRC 150. Alternatively, SCRC 150 could be controlled solely through the use of a linear phase ramp in which the phase angle reference to SCRC 150 is linearly advanced with time and PLC 160, summing junction 170 and PI controller 180 are unnecessary. Thus, incorporation of SCRC 150 results in the elimination in a motor starting circuit of the need for inverter isolation breaker 40, starting breaker 70 and resistance means 80 as known in the prior art.

Figure 3:
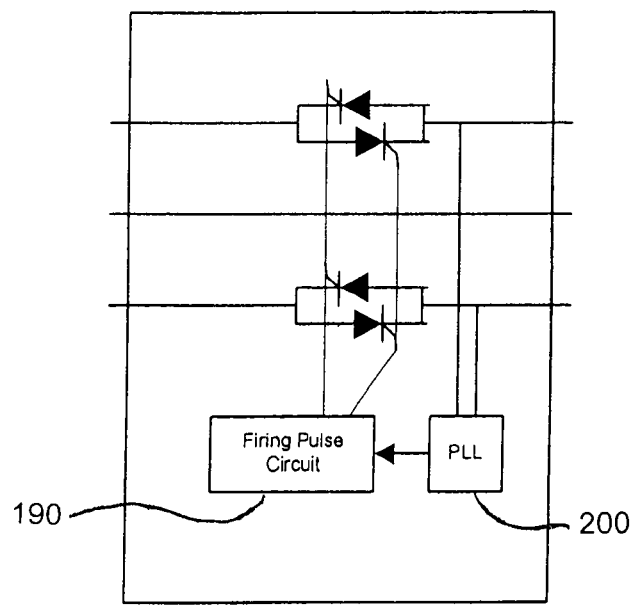
FIG. 3 is an illustration of a phase controlling SCR comprised of four SCR's.
Figure 4:
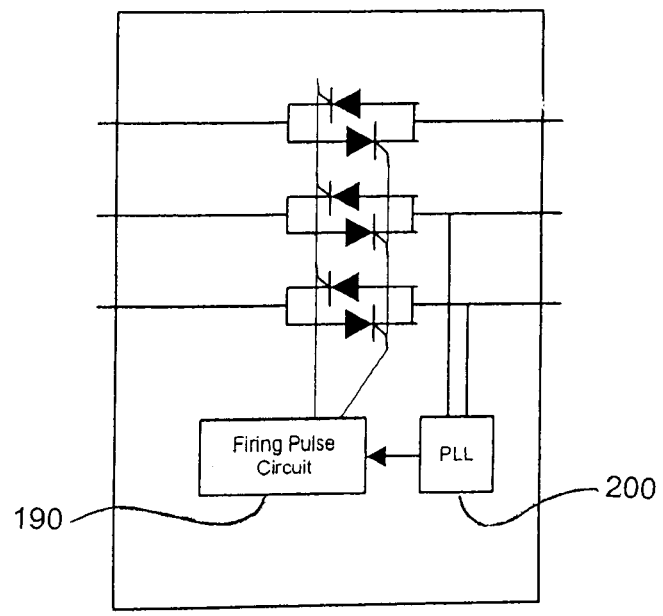
FIG. 4 is an illustration of a phase controlling SCR comprised of six SCR's.

FIGS. 3 and 4 illustrate various plural SCR configurations of SCRC 150. FIG. 3 illustrates SCRC 150 configured with four SCR's in a three phase anti-parallel arrangement. Operation of the SCR's is governed by conventional firing pulse circuit 190 which is itself controlled by conventional phase locked loop circuit 200 acting in response to the phase angle signal received from PI controller 180. FIG. 4 illustrates SCRC 150 configured with six SCR's in a three phase anti-parallel arrangement and also incorporating a firing pulse circuit 190 and a phase-locked loop circuit 200 both of which function as described with regard to FIG. 3. Again, it should be noted that each SCR shown may itself be comprised of a multiplicity of SCR's connected in series and parallel in order to achieve the required voltage and current rating.

In order to effectively use the primary method of this invention, motor 120 must be "off", in other words, have no rotation. SCRC 150 functions as a switch which, at this point, is also in the "off" position with all SCR gates open so that no rotor current flows and no torque is generated at the motor shaft. In order to start the motor, stator isolation breaker 110 is closed so that utility mains 100 can deliver voltage and current to motor 120. The degree to which SCRC 150 is turned "on" depends on the load and inertia on the particular system in which SCRC 150 is being used, the resultant torque developed by motor 120 and the power rating of VSC 130. The maximum torque as a function of a motor's speed can be stated as:

$$T = P_{rot}/(Ws - Wm)$$

where $P_{rot}$ is the rated power of VSC 130, $W_s$ is the power utility frequency along the mains and $W_m$ is the mechanical speed of the motor. Thus, when the speed is low during starting, minimal or no power is delivered to VSC 130 as SCRC 150 is either "off" or only partially "on" and generated rotor power is returned back to the line rather than being dissipated in resistance means 80 as in the prior art. During this starting mode, VSI 140 is also off and power is rectified inherently by the diodes in its IGBT-based devices. By gradually increasing the output of SCRC 150 in response to phase angle signals transmitted by PI 180, torque from motor 120 does not exceed the ratings of VSC 130. The initial power reference signal generated by signal generator 160 is based on the process requirement for acceleration and the capability of VSC 130 to handle output from the motor rotor based on its ratings. Eventually, the mechanical speed of the motor rises to the point where the rotor voltage is within the ratings of VSI 140, and SCRC 150 is effectively completely "on", which is to say that it is no longer controlled but is just locked in the gated on position and left in that position.

Alternatively, the method of this invention could also be adapted to and implemented in a variety of situations such as, for example, if power to motor 120 were lost during its operation resulting in a speed reduction significant enough to warrant the reintroduction of protection of the drive circuit by SCRC 150 until voltage from the rotor circuit of motor 120 falls to a level where it does not exceed the rating of VSI 140. In this situation, in response to an altered feedback power signal from VSC 130, PI controller 180 would generate a new phase angle signal for transmission to SCRC 150 which would effectively cause SCRC 150 to unlock from the gated position and either partially or completely turn off, as required by the situation. Other scenarios requiring protective intervention by SCRC 150 could also be envisioned.

The foregoing invention has been described in terms of the preferred embodiment. However, it will be apparent to those skilled in the art that various modifications and variations can be made to the disclosed apparatus and method without departing from the scope or spirit of the invention and that legal equivalents may be substituted for the specifically disclosed elements of the invention. The specification and examples are exemplary only, while the true scope of the invention is defined by the following claims.

What is claimed is:

1. A system exclusively for starting a wound rotor motor having a stator connected by an AC bus to a three phase AC power source comprising:

a phase-angle controlled silicon controlled rectifier converter configured to have at least four silicon controlled rectifiers connected in at least two anti-parallel arrangements, each having an input and an output, the input of which is connected to the rotor of the motor;

a voltage source inverter configured as an IGBT-based power supply having an input and an output, the input of which is connected to the output of said converter;

a voltage source converter configured as at least two separate IGBT-based DC/AC power supplies connected in parallel, having an input and an output, the input of which is connected by a bidirectional constant voltage DC bus to the output of said inverter and the output of which is connected to the AC bus.

2. The system of claim 1 wherein said silicon controlled rectifier converter is further comprised of at least six silicon controlled rectifiers connected in at least three anti-parallel arrangements.

3. A system for starting and regulating a wound rotor motor having a stator connected by a first AC bus to an AC power source comprising:
   a silicon controlled rectifier converter having two inputs and an output, the first input of which is connected to the rotor of the motor by a second AC bus;
   a voltage source inverter having an input and an output, the input of which is connected by a third AC bus to the output of said silicon controlled rectifier converter;
   a voltage source converter having an input and two outputs, the input of which is connected by a bidirectional DC bus to the output of said voltage source inverter and the first output of which is connected to the first AC bus;
   a signal generator having an output;
   a summing junction having two inputs and one output, connected at the first input to the output of said signal generator and at the second input to the second output of said voltage source converter; and
   a proportional-integral controller having an input and an output, the input of which is connected to said summing junction and the output of which is connect to said silicon controlled rectifier converter.

4. The system of claim 3 wherein the power source is a three phase power source.

5. The system of claim 3 wherein said voltage source converter is an IGBT-based DC/AC power supply.

6. The system of claim 5 wherein said voltage source inverter is an IGBT-based power supply.

7. The system of claim 3 wherein said voltage source converter comprises at least two separate voltage source converters connected in parallel.

8. The system of claim 3 wherein said silicon controlled rectifier converter is further comprised of at least four silicon controlled rectifiers connected in at least two anti-parallel arrangements.

9. The system of claim 8 wherein said silicon controlled rectifiers are regulated by a phase-locked loop controlling a firing pulse circuit.

10. The system of claim 3 wherein said silicon controlled rectifier converter is further comprised of at least six silicon controlled rectifiers connected in at least three anti-parallel arrangements.

11. The system of claim 10 wherein said silicon controlled rectifiers are regulated by a phase-locked loop controlling a firing pulse circuit.

12. A system for starting and regulating a wound rotor motor having a stator connected by a first AC bus to an AC power source comprising:
   a silicon controlled rectifier converter having two inputs and an output, the first input of which is connected to the rotor of the motor by a second AC bus;
   a voltage source inverter having an input and an output, the input of which is connected by a third AC bus to the output of said silicon controlled rectifier converter;
   a voltage source converter having an input and an output, the input of which is connected by a bidirectional DC bus to the output of said voltage source inverter and the output of which is connected to the first AC bus; and
   a linear phase ramp connected to the second input of said silicon controlled rectifier converter.

13. The system of claim 12 wherein the power source is a three phase power source.

14. The system of claim 12 wherein said voltage source converter is an IGBT-based DC/AC power supply.

15. The system of claim 14 wherein said voltage source inverter is an IGBT-based power supply.

16. The system of claim 12 wherein said voltage source converter comprises at least two separate voltage source converters connected in parallel.

17. The system of claim 12 wherein said silicon controlled rectifier converter is further comprised of at least four silicon controlled rectifiers connected in at least two anti-parallel arrangements.

18. The system of claim 17 wherein said silicon controlled rectifiers are regulated by a phase-locked loop controlling a firing pulse circuit.

19. The system of claim 12 wherein said silicon controlled rectifier converter is further comprised of at least six silicon controlled rectifiers connected in at least three anti-parallel arrangements.

20. The system of claim 19 wherein said silicon controlled rectifiers are regulated by a phase-locked loop controlling a firing pulse circuit.

21. A system exclusively for starting and regulating a wound rotor motor having a stator connected by a first AC bus to an AC power source comprising:
   first means connected to the motor rotor for receiving AC output therefrom, for adjusting the gating position and gating duration of a plurality of silicon controlled rectifiers contained therein in response to a control signal and for producing an AC output;
   second means for receiving power output from said first means and for providing motor drive control by transmitting power to the first AC bus; and
   third means for producing the control signal and transmitting that signal to said first means.

22. The system of claim 21 wherein said first means further comprises at least four silicon controlled rectifiers connected in at least two anti-parallel arrangements.

23. The system of claim 21 wherein said first means further comprises at least six silicon controlled rectifiers connected in at least three anti-parallel arrangements.

24. The system of claim 21 wherein the power source is a three phase power source.

25. The system of claim 21 wherein said second means further comprises:
   a first IGBT-based power supply means for receiving AC from said first means and for outputting a DC signal; and
   a second IGBT-based power supply means connected by a constant voltage DC bus to said first power supply means for regulating the voltage on the DC bus, for producing a feedback signal and for transmitting power to the first AC bus.

26. The system of claim 25 wherein said first power supply means is a voltage source inverter and said second power supply means is a voltage source converter.

27. The system of claim 25 wherein said third means further comprises:
   reference signal generating means for producing a power reference signal;
   comparing means for receiving the feedback signal from said second power supply means and for subtracting the feedback signal from the power reference signal to produce an error signal; and
   controller means for receiving the error signal and using it to generate a phase angle reference for transmission to said first means.

28. The system of claim 25 wherein said third means further comprises linear phase ramp means for generating a phase angle reference for transmission to said first means wherein said phase angle reference is linearly advanced over time.

29. A method exclusively for starting and regulating a wound rotor motor with an AC power source line using a drive circuit having both a voltage source converter with specified ratings connected to the output of a voltage source inverter with specified ratings wherein the input of a silicon controlled rectifier converter is connected to the rotor of the motor and the output of the silicon controlled rectifier converter is connected to the input of the voltage source inverter comprising:

supplying AC power to the stator of the motor;

delivering AC power generated by the rotor of the motor to a silicon controlled rectifier converter partially comprised of at least four silicon controlled rectifiers;

generating a phase angle control signal;

transmitting the phase angle control signal to the silicon controlled rectifier converter;

adjusting the gating of all of the silicon controlled rectifiers in response to the phase angle control signal such that the output of the silicon controlled rectifier converter does not exceed the ratings of either the voltage source converter or the voltage source inverter; and returning rotor power passed through to the voltage source converter back to the AC power source line.

30. The method of claim 29 wherein generating further comprises:

producing a feedback power signal from the voltage source converter;

establishing a power reference signal;

subtracting the feedback power signal from the power reference signal to produce an error signal; and integrating the error signal to generate the phase angle control signal.

31. The method of claim 30 wherein establishing is based on the process requirement for acceleration and the power rating of the voltage source converter.

32. The method of claim 29 wherein generating further comprises advancing the phase angle control signal linearly corresponding with the passage of time.

33. The method of claim 29 wherein adjusting further includes controlling a phase locked loop with the phase angle control signal so as to regulate a firing pulse circuit.

* * * * *